(12) United States Patent
Kioski et al.

(10) Patent No.: US 9,301,025 B2
(45) Date of Patent: Mar. 29, 2016

(54) REMOVABLE SENSOR MODULES

(71) Applicant: Telect Inc., Liberty Lake, WA (US)

(72) Inventors: Bryan Joseph Kioski, Spokane, WA (US); David Knaggs, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 128 days.

(21) Appl. No.: 13/788,569

(22) Filed: Mar. 7, 2013

(65) Prior Publication Data

US 2014/0254115 A1 Sep. 11, 2014

(51) Int. Cl.
*H05K 7/14* (2006.01)
*H04Q 1/02* (2006.01)

(52) U.S. Cl.
CPC ....................... *H04Q 1/15* (2013.01)

(58) Field of Classification Search
CPC ........................................................ H05K 7/14
USPC .............. 361/728–747, 752–759, 796–802,
361/805–837; 385/88, 53; 340/146.2, 663,
340/815.4–815.92, 901–996; 379/37–52,
379/90.01–110.01
See application file for complete search history.

(56) References Cited

U.S. PATENT DOCUMENTS

| | | | |
|---|---|---|---|
| 4,616,207 A * | 10/1986 | Knapp, Jr. ............. | H01H 85/30 337/206 |
| 4,798,546 A * | 1/1989 | Herbert ................. | H01H 85/20 337/260 |
| 5,305,174 A | 4/1994 | Morita et al. | |
| 6,067,023 A * | 5/2000 | Bendikas ............... | H02H 3/04 340/638 |
| 6,108,185 A | 8/2000 | Kim et al. | |
| 6,347,963 B1 * | 2/2002 | Falkenberg .......... | H01R 2/7088 361/788 |
| 6,752,665 B2 * | 6/2004 | Kha ...................... | H01R 13/447 439/668 |
| 6,824,312 B2 * | 11/2004 | McClellan .......... | H05K 7/1448 385/53 |
| 6,875,060 B2 * | 4/2005 | Musolf ............... | H01R 13/7033 439/188 |
| 7,054,163 B2 * | 5/2006 | Coffey ................. | H04Q 1/14 361/730 |
| 7,274,187 B2 * | 9/2007 | Loy ...................... | G01R 22/065 324/142 |
| 7,423,858 B2 * | 9/2008 | Dobbs ................. | H01H 71/125 361/93.1 |
| 7,468,891 B2 * | 12/2008 | Lipski ................. | G02B 6/4452 361/679.01 |
| 7,554,796 B2 * | 6/2009 | Coffey ................. | H02J 1/108 307/42 |
| 7,690,944 B2 | 4/2010 | Matsumura et al. | |
| 7,715,210 B2 * | 5/2010 | Clark ................... | H05K 7/1425 361/800 |
| 8,116,095 B2 * | 2/2012 | Dorenkamp ......... | G02B 6/4452 361/729 |

(Continued)

FOREIGN PATENT DOCUMENTS

EP 1072285 1/2001
EP 2241898 10/2010

(Continued)

OTHER PUBLICATIONS

The PCT Search Report mailed Oct. 21, 2014 for PCT application No. PCT/US14/21848, 10 pages.

(Continued)

*Primary Examiner* — Courtney Smith
*Assistant Examiner* — Rashen E Morrison
(74) *Attorney, Agent, or Firm* — Lee & Hayes, PLLC

(57) ABSTRACT

A removable telecommunication sensor module is configured to be removably coupled between a power protection device and a backplane. The removable telecommunication sensor module monitors energy usage at a telecommunication equipment circuit level for a piece of telecommunication equipment arranged in a telecommunication network infrastructure.

19 Claims, 6 Drawing Sheets

(56) References Cited

U.S. PATENT DOCUMENTS

| | | | |
|---|---|---|---|
| 8,625,748 B2 * | 1/2014 | Kioski | H04Q 1/15 361/636 |
| 2002/0181249 A1 * | 12/2002 | Coffey | H02J 1/00 363/1 |
| 2002/0181896 A1 * | 12/2002 | McClellan et al. | 385/88 |
| 2004/0057224 A1 * | 3/2004 | Kiko | H04Q 1/115 361/828 |
| 2004/0100387 A1 * | 5/2004 | Torrez | H01H 85/306 340/638 |
| 2004/0113804 A1 * | 6/2004 | Cabrera | H05K 7/1457 340/663 |
| 2005/0013077 A1 | 1/2005 | Gemme et al. | |
| 2005/0122701 A1 * | 6/2005 | Coffey | 361/796 |
| 2006/0043961 A1 | 3/2006 | Loy | |
| 2006/0077609 A1 | 4/2006 | Bender et al. | |
| 2007/0223160 A1 | 9/2007 | Coffey et al. | |
| 2009/0142953 A1 * | 6/2009 | Patel | H01R 12/7088 439/345 |
| 2009/0154129 A1 * | 6/2009 | Clark | H05K 7/1425 361/796 |
| 2009/0234512 A1 | 9/2009 | Ewing et al. | |
| 2010/0118458 A1 | 5/2010 | Coffey | |
| 2010/0280774 A1 | 11/2010 | Ewing et al. | |
| 2010/0290605 A1 | 11/2010 | Wright et al. | |
| 2011/0255202 A1 | 10/2011 | Hartmann | |
| 2011/0286154 A1 * | 11/2011 | Coffey | H02J 1/108 361/643 |
| 2012/0194969 A1 * | 8/2012 | Johnsen | H02B 1/26 361/646 |
| 2013/0033830 A1 | 2/2013 | Eckhardt et al. | |
| 2013/0108027 A1 | 5/2013 | Kioski et al. | |
| 2014/0104737 A1 * | 4/2014 | Coffey | H02J 1/108 361/87 |
| 2014/0119519 A1 | 5/2014 | Kioski et al. | |
| 2014/0254115 A1 * | 9/2014 | Kioski | H04Q 1/15 361/752 |
| 2015/0016029 A1 | 1/2015 | Johnsen | |

FOREIGN PATENT DOCUMENTS

| | | |
|---|---|---|
| JP | 7229935 | 8/1995 |
| JP | 2001221812 | 8/2001 |
| WO | WO2007143834 | 12/2007 |

OTHER PUBLICATIONS

The Extended European Search Report mailed May 7, 2015 for European patent application No. 12845963.3, 5 pages.

Office Action for U.S. Appl. No. 14/146,661, mailed on Nov. 6, 2014, Bryan Joseph Kioski, "Removable Sensor Modules", 6 pages.

Non-Final Office Action for U.S. Appl. No. 13/287,920, mailed on Mar. 14, 2013, Bryan Joseph Kioski et al., "Removable Sensor Modules", 9 pages.

The PCT Search Report mailed Mar. 13, 2013 for PCT application No. , 9 pages.

* cited by examiner

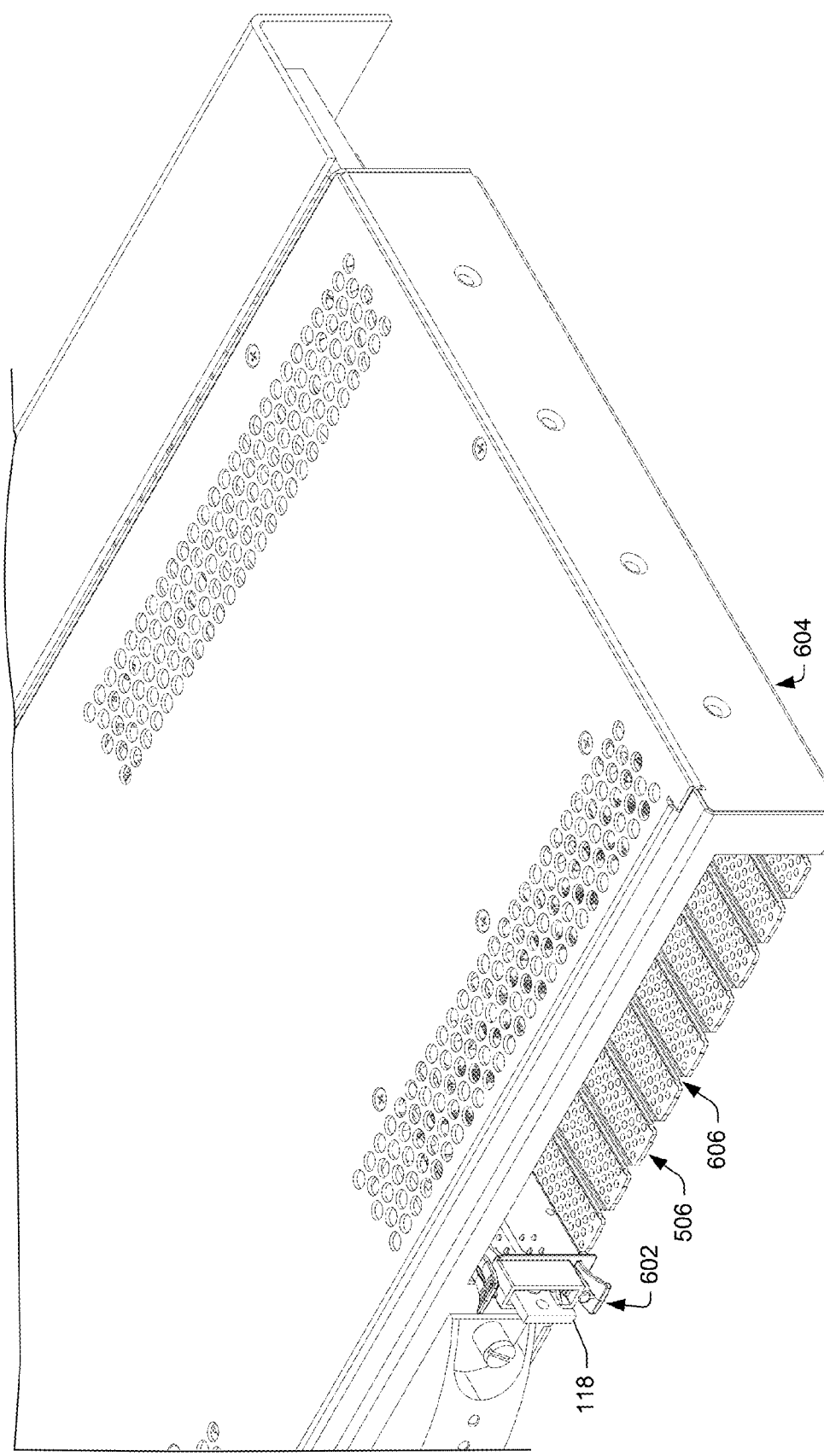

REMOVABLE SENSOR MODULES

BACKGROUND

Existing telecommunications energy monitoring methods are very coarse. For instance, energy management systems and methods have traditionally been utilized at a site level (e.g., a central office site or a wireless site). For example, historically a telecommunication organization simply monitored energy consumption of a single site by way of regularly comparing the site's utility bills from month to month. While this approach helps ensure that the telecommunication site's energy consumption is at least consistent, it does not provide visibility to power consumption by each piece of telecommunication equipment arranged in the telecommunication site. Further, while this approach provides visibility to the telecommunication site's energy consumption infrequently (i.e., month to month) it does not provide visibility to power consumption by each piece of telecommunication equipment arranged in the telecommunication site on demand, in real-time, or without perceivable delay.

As such, telecommunications companies are beginning to monitor power consumption at a power distribution system level. Specifically, telecommunications companies are beginning to monitor power consumption at a primary power distribution level (e.g., a battery distribution feeder bay (BDFB)). For example, a telecommunications company may monitor energy consumption of a primary power distribution system by monitoring a current shunt monitor of the primary power distribution system. While this approach provides visibility to power consumption at the primary power distribution level, it also does not provide visibility to power consumption by each piece of telecommunication equipment arranged in the telecommunication site. The removable telecommunication sensor modules described herein address these problems by providing integrated current monitoring functionality into a separate fuse holder. By integrating current monitoring functionality into the fuse holder this provides a removable telecommunication sensor module having a slim profile that produce a high density of power distribution devices (e.g., number of breaker slots and/or fuse slots per one rack unit (1RU)). Further, by integrating current monitoring functionality into the fuse holder this simplifies the current monitoring architecture, lowers assembly cost, frees up printed circuit board assembly (PCA) space, and reduces maintenance in the event of a failure.

SUMMARY

This summary is provided to introduce simplified concepts for removable telecommunication sensor modules and a method of using the same, which is further described below in the Detailed Description. This summary is not intended to identify essential features of the claimed subject matter, nor is it intended for use in determining the scope of the claimed subject matter.

A removable telecommunication sensor module is provided to monitor energy usage at a telecommunication equipment circuit level for a piece of telecommunication equipment arranged in a telecommunication network infrastructure.

In one example, a removable sensor module may be removeably coupled between a power protection device and a backplane (e.g., printed circuit board assembly (PCA)) as a self-contained stand-alone single unit. The self-contained stand-alone removable sensor module may be easily inserted into a slot of a power distribution system (e.g., a secondary power distribution panel) and removably coupled to the backplane. A power protection device may also subsequently be inserted into the same slot and removably coupled to the self-contained removable sensor module. One removable sensor module may monitor a load output of a piece of telecommunication equipment.

In one example, the removable sensor module may comprise one or more electrical contact pads arranged on top of a current monitoring assembly (e.g., a printed circuit assembly (PCA)) to directly contact with an electrical contact portion of a power protection device. The removable sensor module may comprise one or more electrical contact clips arranged above the electrical contact pads. The electrical contact clips may be arranged to apply a force on the electrical contact portion of the power protection device to force the electrical contact portion of the power protection device onto the one or more electrical contact pads arranged on the PCA.

In one example, the current monitoring assembly may include one or more power input and power output contacts arranged to removeably couple with a backplane. The current monitoring assembly may also include one or more unprotected traces arranged between the one or more clips and the one or more power output contacts to dissipate heat from the one or more unprotected traces directly to ambient air.

In another example, the removable sensor module may comprise a cover arranged to cover only a first side of the current monitoring assembly and not a second side opposite the first side. By covering only the first side, the cover protects components (e.g., sensors, monitors, resistors, capacitors, transistors, field-effect transistors (FETs), traces, etc.) fixed to the first side of the current monitoring board, while providing for the one or more unprotected traces, arranged on the second side, to dissipate heat directly to ambient air.

In another example, the removable sensor module may comprise a current monitor arranged on the current monitoring assembly. The current monitor may be arranged on the first side of the current monitoring assembly and protected by the cover.

BRIEF DESCRIPTION OF THE DRAWINGS

The detailed description is described with reference to the accompanying figures. The use of the same reference numbers in different figures indicates similar or identical items.

FIG. 6 illustrates another example implementation of a removable sensor module for use in power distribution system.

DETAILED DESCRIPTION

Overview

Figure 1:
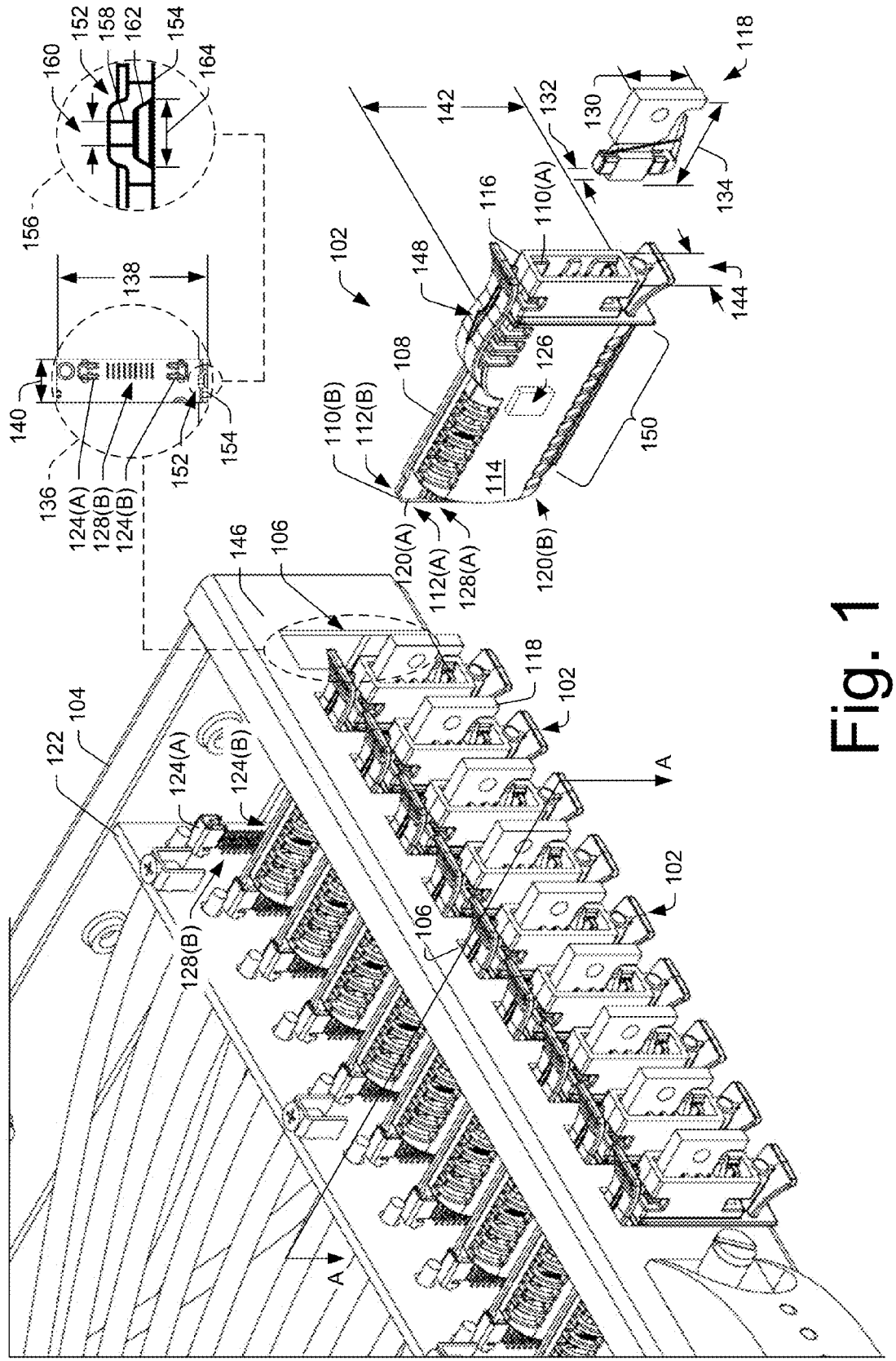
FIG. 1 illustrates an example implementation of a removable sensor module for use in a power distribution system.

This disclosure is directed to removable telecommunication sensor modules and a method of using the same. The removable sensor modules are easily installed and/or replaced. The removable sensor modules may comprise a current monitoring assembly (e.g., a printed circuit assembly (PCA)) and a cover fixed to the current monitoring assembly and covering a single side of the current monitoring assembly. The cover provides protection for the components and provides for removably installing the removable sensor module into a slot of a power distribution system (e.g., a secondary power distribution panel).

The current monitoring assembly may include one or more single sided clips fixed to a first end of the current monitoring assembly. Each of the one or more single sided clips may be arranged above an electrical contact pad (e.g., an exposed trace) arranged on top of a first planar surface of the current monitoring assembly. The one or more single sided clips and contact pads may cooperatively couple with an electrical contact portion of a power protection device.

Because the power protection device is directly in contact with the electrical contact pad (i.e., there is no power protection device housing between the power protection device and the current monitoring assembly), the removable sensor modules have a thinner profile exhibited by a thin thickness as compared to removable sensor modules having a housing fixed on the current monitoring assembly. This is because without the housing or receptacle between the power protection device and the current monitoring assembly, the power protection device is positioned closer to the current monitoring assembly than a power protection device housed in a housing fixed on the current monitoring assembly.

Also, because the removable sensor modules have a thin profile exhibited by a thin thickness, this reduces bowing (e.g., a displacement, a deformation, a deflection, etc.) of the current monitoring assembly when mating the removable sensor module to a backplane. This is because the power protection device is positioned directly in contact with the current monitoring assembly, which reduces a distance (i.e., a lever-arm distance) from the current monitoring assembly to the power protection device receptacle. The reduced lever-arm distance reduces the bowing of the current monitoring assembly during installation and/or removal of the current monitoring assembly.

Further, because the power protection device is directly in contact with the electrical contact pad, the removable sensor modules provide a lower electrical and thermal resistance than removable sensor modules having a housing fixed to a current monitoring assembly. This is because the removable sensor modules not having a housing fixed to the current monitoring assembly do not have the added electrical and/or thermal resistances produced by a housing arranged between the power protection device and the current monitoring assembly. Thus, the electrical and thermal resistance circuits of the removable sensor modules not having a housing arranged between the power protection device and the current monitoring assembly have fewer electrical and thermal resistance junctions than removable sensor modules having a housing arranged between the power protection device and the current monitoring assembly.

Further, because the removable sensor modules do not have a housing fixed to the current monitoring assembly, this reduces a quantity of components needed for manufacturing the current monitoring assembly. This produces a lower cost of manufacturing the removable sensor modules not having a housing fixed to the current monitoring assembly, than a cost of manufacturing removable sensor modules having a housing fixed to the current monitoring assembly.

The current monitoring assembly may include one or more power input and power output contacts and/or one or more signal contacts arranged in a second end, opposite the first end, of the current monitoring assembly. The one or more power input and power output contacts and/or one or more signal contacts may provide for connecting the removable sensor modules to a backplane and/or a harness. The one or more signal contacts may pass signals to a central control board. The one or more power input and power output contacts may provide for passing current to a load (e.g., a piece of telecommunications equipment).

The current monitoring assembly may include a current monitor or current sensor. In some implementations, the current monitor may be a Hall Effect current monitor fixed on the first planar surface of the current monitoring assembly. The current monitor may monitor and report a current flowing through one or more unprotected power input and power output traces for the load. The current monitor may pass signals to the central control board.

Because, in this example, the removable sensor modules are self-contained single units, the removable sensor modules may be installed in the same single slot as a commercial off-the-shelf (COTS) power protection device (e.g., a breaker and/or a fuse). This provides for cost effective replacement and upgrade. For example, because the removable sensor modules are self-contained single units a user may simply replace a removable sensor module without having to replace a breaker and/or a fuse as well. Further, because the removable sensor modules are self-contained single units a user may simply replace a breaker and/or a fuse without having to replace a sensor.

In addition, because the removable sensor modules may be installed in the same single slot as a commercial off-the-shelf (COTS) breaker and/or fuse, a breaker and/or fuse panel density (i.e., number of breaker slots and/or fuse slots per one rack unit (1RU)) may be maintained. For example, because the removable sensor modules are self-contained as single units, the power protection devices remain intact. This eliminates any modification of the power protection devices. As such, the size of the power protection devices remains intact (i.e., remains stock COTS size) and likewise the breaker and/or fuse panel density remains intact. Further, the function of the power protection devices remains intact and as such the reliability of the power protection devices remains intact.

While the illustrated embodiments show secondary power distribution panels comprising breakers and/or fuses, the breakers and fuses may be of any type of power protection devices suitable for use in power systems. For example the breakers and/or fuses may be TPS, TLS, breakers, KTK, KLM, TPC, GMT "grasshopper" type power protection devices. Further, while the illustrated embodiments show secondary power distribution panels suitable for powering telecommunications equipment configured to utilize −48 VDC, +24 VDC, or other voltages, suitable for powering telecommunications equipment, the secondary power distribution panels may be of any type of power distribution panels. For example, the power distribution panels may be a distribution board, panel board, electrical panel, service panel, load center, or the like.

Further, while the illustrated embodiments show power distribution systems configured as fuse panels, the power distribution systems may be configured in a variety of ways to provide power distribution in a single compact unit. For example, the power distribution systems may be configured as breaker panels, dual-feed panels, combination breaker/fuse panels, combination dual-feed breaker/fuse panels, or the like.

The power distribution systems may be configured to be installed in a cabinet, a rack, an enclosure, a chassis, a housing, or the like. For example, the power distribution systems may be installed in a rack and consume four rack units (4RUs) of the rack. In another example, the power distribution systems may be installed in a rack and consume 1RU of the rack.

Further, a cabinet may be configured in a variety of ways to maintain or hold a plurality of components in a telecommunications infrastructure. For example, a cabinet may be configured as a cabinet for a primary power distribution panel (e.g., a battery distribution feeder bay (BDFB)), a secondary power distribution panel (e.g., a breaker panel and/or a fuse panel) a housing, a terminal block, a panel, a chassis, a digital cross-connect, a switch, a hub, a rack, a frame, a bay, a module, an enclosure, an aisle, or other structure for receiving and holding a plurality of components.

Example Monitoring Systems

FIG. 1 illustrates an example implementation of a removable sensor module 102 for use in a power distribution system 104. The removable sensor module 102 may be inserted as a single unit into a slot 106 of the power distribution system 104. For example, a user can easily install and/or replace a removable sensor module 102 which requires only front access because of the removable sensor module's 102 blind-mate installation. This provides for replacing failed removable sensor modules 102 or upgrading from "non-monitoring" to monitoring removable sensor modules 102. Further, this provides for switching to a different current range (e.g., switching from a 15 A max version to a 20 A max version).

The removable sensor module 102 may include a printed circuit assembly (PCA) 108. The PCA 108 may have a first end 110(A) opposite a second end 110(B), and a first planar surface 112(A) opposite a second planar surface 112(B). The removable sensor module 102 may include a cover 114. In one example, the cover 114 may be arranged to only cover the first planar surface 112(A) of the PCA 108, and not cover the second planar surface 112(B). The cover 114 may include a receptacle 116 for removably coupling with a power protection device 118. For example, the receptacle 116 may be configured as a fuse holder (e.g., a GMT type fuse holder), and formed integral with the cover 114. For example, the cover 114 and the receptacle 116 may be formed as a single unit of material. The cover 114 and the receptacle 116 may be formed as a single unit of plastic (e.g., high density polyethylene (HDPE), polypropylene (PP), polystyrene (PS), polytetrafluoroethylene (PTFE), polyvinylchloride (PVC), polychlorotrifluoroethylene (PCTFE or PTFCE), polycarbonate (PC), acrylonitrile butadiene styrene (ABS), etc.). While the receptacle 116 is illustrated as comprising a GMT type fuse holder, the receptacle 116 may be a KTK, KLM, TPA, TPC, TPS, TLS or the like, type fuse holder.

The removable sensor module 102 may comprise power input and power output contacts 120(A) and 120(B) arranged in the second end 110(B) of the PCA 108. For example, the power input and power output contacts 120(A) and 120(B) may be unprotected or exposed traces arranged in the first planar surface 112(A) and/or the second planar surface 112(B). The power input and power output contacts 120(A) and 120(B) may provide for removably coupling with an internal electrical component 122 (e.g., a backplane, a harness, a bus bar, etc.). For example, the power input and power output contacts 120(A) and 120(B) may provide for removably coupling with cooperating power input and power output connectors 124(A) and 124(B) to make an electrical connection with the internal electrical component 122. While the power input and power output contacts 120(A) and 120(B) are illustrated as comprising unprotected traces and the cooperating power input and power output connectors 124(A) and 124(B) are illustrated as comprising cooperating card edge style connectors, the power input and power output contacts 120(A) and 120(B) and cooperating power input and power output connectors 124(A) and 124(B) may additionally or alternatively utilize pins, headers, clips, or the like to make an electrical connection with the internal electrical component 122.

The removable sensor module 102 may comprise a current monitor 126, shown in FIG. 1 in dashed lines to illustrate that the current monitor 126 is arranged behind the cover 114, and arranged on the PCA 108. The current monitor 126 may be arranged on the PCA 108 between the first end 110(A) and the second end 110(B) of the PCA 108. The current monitor 126 may provide for monitoring a current flowing through the removable sensor module 102 and reporting of a signal based on the monitored current. The current monitor 126 may be a Hall Effect current monitor. While FIG. 1 illustrates a removable sensor module 102 having a current monitor 126 arranged on the PCA 108, in other embodiments the removable sensor module 102 may not have a current monitor 126 arranged on the PCA 108. In such an implementation, the removable sensor module 102 may be devoid of current monitoring hardware and may be a "non-monitoring" removable sensor module 102. For example, the "non-monitoring" removable sensor module 102 may pass a current from the power protection device 118 to the internal electrical component 122 (e.g., a backplane, a harness, a bus bar, etc.) without monitoring a current passing through the removable sensor module 102.

The removable sensor module 102 may comprise a signal pin header 128(A) fixed to the second end 110(B) of the PCA 108. The signal pin header 128(A) may provide for removably coupling with cooperating signal pins 128(B) of the internal electrical component 122. The signal pin header 128(A) and cooperating signal pins 128(B) may provide signal contacts with the internal electrical component 122. The signal pin header 128(A) and cooperating signal pins 128(B) may provide for receiving and/or reporting signals to and/or from a central control board.

The removable sensor module 102 may have external dimensions that are driven, or otherwise constrained by the dimensions of the power protection device 118, and likewise the dimensions of the slot 106. For example, the power protection device 118 may be a GMT type fuse having a standard height 130 of about 0.7 inches (18 millimeters), a standard width 132 of about 0.1 inches (2 millimeters), and a standard depth 134 of about 0.8 inches (20 millimeters). However, in other examples the power protection device 118 may be a TPS, TLS, KTK, KLM, etc. type power protection device.

Detail view 136 illustrates that the slot 106 may have an opening also having dimensions driven by the dimensions of the power protection device 118. For example, the slot 106 may have an opening having dimensions capable of receiving a portion of the GMT type fuse. In this embodiment, where the slot 106 has an opening to receive a GMT type fuse, the slot 106 may have an opening having a height 138 of about 1.3 inches (33 millimeters) and a width 140 of about 0.5 inches (13 millimeters). The removable sensor module 102 may have a height 142 of about 1.3 inches (33 millimeters) and a width 144 of about 0.5 inches (13 millimeters) for cooperating with the slot 106 and the power protection device 118. However, the removable sensor modules 102 may have a height and width for cooperating with a slot and a TPS, TLS, KTK, KLM, or the like type power protection device.

The cover 114 may provide for securing the removable sensor module 102 in the slot 106. For example, a user can easily removably install each removable sensor module 102 as a single unit into a slot 106 of the power distribution system 104 via a blind-mate installation. For example, a user may insert a removable sensor module 102 into a slot 106 and removably connect the power input 120(A), the power output 120(B), and/or the signal pin header 128(A), to the internal electrical component 122 (e.g., backplane). A user may removably fasten the cover 114 to a front surface 146 of the power distribution system 104 via a latch 148 and a rail 150 arranged in the cover 114, securing the removable sensor module 102 to the power distribution system 104. For example, detail view 136 illustrates the slot 106 may include a groove 152 arranged in a bottom surface 154 of the power distribution system 104 to slidably receive the rail 150 of the cover 114.

Detail view 156 illustrates the groove 152 may include a gap 158 arranged in the bottom surface 154 of the power distribution system 104. The gap 158 may have a width 160 of about the same as a thickness of the rail 150 of the cover 114. For example, an edge of the rail 150 may have a thickness of about 0.02 inches (0.5 millimeters), and likewise the gap 158 may have a width 160 of about 0.02 inches (0.5 millimeters). The gap 158 may slidably receive the edge of the rail 150. For example, a user may removably install the removable sensor module 102 into a slot 106, and slidably displace the edge of the rail 150 along the gap 158 to blind-mate the removable sensor module 102 with the internal electrical component 122.

Detail view 156 further illustrates that the groove 152, may comprise another gap 162 arranged in the bottom surface 154 of the power distribution system and interconnected with the gap 158. The other gap 162 may have a width 164 wider than the width 160 of the gap 158 to slidably receive a flange of the rail 150. For example, a user may removably install the removable sensor module 102 into a slot 106, and slidably displace the flange of the rail 150 along the other gap 162 to blind-mate the removable sensor module 102 with the internal electrical component 122. The flange of the rail 150 and the other gap 162 may cooperate to prevent the removable sensor module 102 from being displaced vertically relative to the power distribution system 104. For example, the flange of the rail 150 may interfere with a surface of the other gap 162 to prevent or keep the removable sensor module 102 from being displaced vertically up towards the power distribution system 104 as the removable sensor module 102 is removably installed in the power distribution system 104. Further, when the removable sensor module 102 is removably installed in a slot 106, a bottom surface of the flange of the rail 150 and the bottom surface 154 of the power distribution system 104 may be substantially coplanar or flush with each other. For example, a plurality of power protection devices 118 may be removably installed in a 17.5 inch (444 millimeters), one rack unit (1RU) power distribution system (i.e., power distribution system 104), and the bottom (i.e., bottom surface of the rail 150) of each of the power protection devices 118 may be substantially coplanar with the bottom surface 154 of the power distribution system 104.

The latch 148 may provide a snap, spring lever, or other mechanism that provides tool-less insertion and removal of the removable sensor module 102. For example, the latch 148 may provide for being vertically displaced (e.g., snap or spring up and/or down) relative to the removable sensor module 102 to be removably latched to the front surface 146 of the power distribution system 104. For example, the latch 148 may be vertically displaced down towards the removable sensor module 102 when the latch interferes with the edge of the opening of the slot 106. In addition to being displaced vertically down towards the removable sensor module 102, the latch 148 may be vertically displaced up away from the removable sensor module 102 when the latch does not interfere with the edge of the opening of the slot 106. For example, after the removable sensor module 102 is inserted into the slot 106, the latch 148 displaces vertically up, away from the removable sensor module 102, to latch in behind the front surface 146.

Further, while FIG. 1 illustrates a portion the front surface 146 of the power distribution system 104 having about 10 removable sensor modules 102, the power distribution system 104 may include additional removable sensor modules 102 arranged in the front surface 146. For example, the front surface 146 of the power distribution system 104 may include about another 10 removable sensor modules 102 removably received in slots 106 arranged in another half portion of the front surface 146 of the power distribution system 104.

FIG. 1 also illustrates a section line A-A. The section line A-A is proximate to a removable sensor module 102 removably received in a slot 106 of the power distribution system 104.

Figure 2:
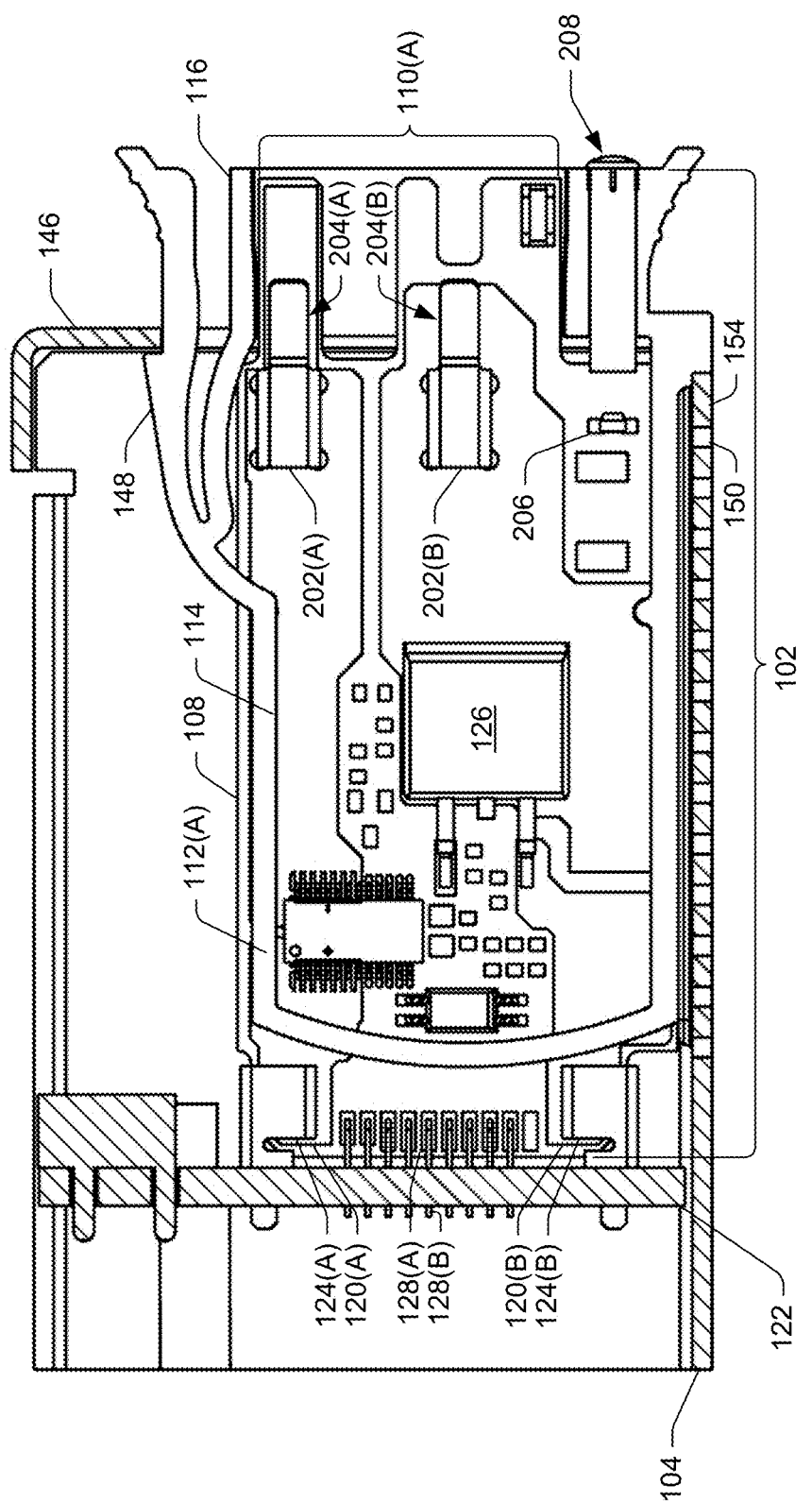
FIG. 2 is a top section view of a removable sensor module installed in a slot of the power distribution system taken along section line A-A of FIG. 1.

FIG. 2 illustrates a top section view of the removable sensor module 102 removably received in the slot 106 of the power distribution system 104 taken along the section line A-A illustrated in FIG. 1, without the power protection device 118 removably coupled with the receptacle 116 of the cover 114.

FIG. 2 illustrates the removable sensor module 102 removably coupled to the internal electrical component 122. For example, FIG. 2 illustrates the power input and power output contacts 120(A) and 120(B) removably coupled with the cooperating power input and power output connectors 124(A) and 124(B). The removably coupled power input and power output contacts 120(A) and 120(B) and cooperating power input and power output connectors 124(A) and 124(B) may pass a current to a load of a piece of telecommunication equipment. The current monitor 126 may provide for monitoring the current and reporting of a signal based on the monitored current to a central control board.

FIG. 2 further illustrates the signal pin header 128(A) removably coupled with cooperating signal pins 128(B) of the internal electrical component 122. The removably coupled signal pin header 128(A) and cooperating signal pins 128(B) may pass signals to a central control board. Further, the PCA 108 may comprise one or more digital inputs and/or outputs, one or more analog inputs and/or outputs, and be communicatively coupled with power sensors.

The PCA 108 may include one or more clips 202(A) and 202(B). The one or more clips 202(A) and 202(B) may be fixed to the first end 110(A) and arranged above one or more electrical contact pads 204(A) and 204(B) arranged on top of the first planar surface 112(A). The one or more clips 202(A) and 202(B) and the one or more electrical contact pads 204(A) and 204(B) may be arranged to cooperatively couple with an electrical contact portion of the power protection device 118. For example, the electrical contact portion of the power protection device 118 may make a direct contact with the one or more electrical contact pads 204(A) and 204(B) and provide a path for a current of a load of a piece of telecommunication equipment. The one or more clips 202(A) and 202(B) may maintain a force (e.g., a spring force), in the direction towards the PCA 108, against the electrical contact portion of the power protection device 118. The force applied by the one or more clips 202(A) and 202(B) may force the electrical contact portion of the power protection device 118 against the one or more electrical contact pads 204(A) and 204(B) on the PCA 108. The one or more clips 202(A) and 202(B) may be made of and/or coated with a conductive material (e.g., brass, copper, steel, aluminum, silver, gold, etc.), and also provide a path for the current of the load of a piece of telecommunication equipment. The one or more clips 202(A) and 202(B) may also dissipate heat.

While FIG. 2 illustrates the one or more clips 202(A) and 202(B) as a thru-hole mount design, other clip mountings are contemplated. For example, the one or more clips 202(A) and 202(B) may be a surface mount design.

Because the power protection device 118 makes a direct contact with the one or more electrical contact pads 204(A) and 204(B) (i.e., no power protection device housing between the power protection device 118 and the PCA 108), the power protection device 118 is positioned directly on the PCA 108. With the power protection device 118 positioned directly on the PCA 108, the power protection device 118 is positioned closer to the PCA 108 of the removable sensor module 102, than if the power protection device 118 was housed in a housing fixed to the PCA 108. Thus, the removable sensor module 102 has a thinner profile exhibited by the thin width 144 as compared to a removable sensor module having a power protection device housing fixed to the PCA 108. This is because the thin width 144 does not include at least the additional thickness of a wall of the power protection device housing fixed to the PCA 108. With the removable sensor module 102 having a thinner profile exhibited by the thin width 144 as compared to a removable sensor module having a power protection device housing fixed to the PCA 108, when a force is exerted on the receptacle 116 to removably install the removable sensor module 102, the thin width 144 reduces an amount of deforming or bowing of the PCA 108. This is because the receptacle 116, the PCA 108, and the one or more power input and power output contacts 120(A) and 120(B) are arranged in a near perfect line exhibited by the thin width 144 of the removable sensor module 102. The thin profile exhibited by the thin width 144 of the removable sensor module 102 provides for better structural integrity during insertion and/or removal of the removable sensor module 102. This is because thin width 144 reduces a distance (i.e., a lever-arm distance) from the PCA 108 to the receptacle 116. The reduced lever-arm distance from the PCA 108 to the receptacle 116 reduces the bowing of the PCA 108 during installation and/or removal of the removable sensor module 102.

Further, because the cover 114 is arranged to only cover the first planar surface 112(A) of the PCA 108, and not to cover the second planar surface 112(B), the thin width 144 of the removable sensor module 102 is maintained. This is because the second planar surface 112(B) of the PCA 108 acts as one side of the removable sensor module 102. For example, the PCA 108 itself is used to complete the removable sensor module 102 assembly via acting as one side of the removable sensor module 102 opposite the cover 114. Thus, the removable sensor module 102 maintains the thin profile exhibited by the thin width 144.

Because the removable sensor module 102 exhibits the thin width 144, more power protection devices 118 per area can be utilized in the power distribution system 104 while providing for airflow over the PCAs 108. For example, the power distribution system 104 may comprise a 17.5 inch (444 millimeters), one rack unit (1RU) chassis, and because the removable sensor module 102 comprises the thin width 144, 20 power protection devices 118 may be utilized in the 17.5 inch (444 millimeters), 1RU chassis while allowing airflow over each PCA 108 of each removable sensor module 102. Because the removable sensor modules 102 and the power protection devices 118 are separate units and are removable relative to each other, and removable relative to the power distribution system 104, the removable sensor modules 102 lower assembly cost and reduce maintenance time in the event of a failure.

The PCA 108 may be fixed to the cover 114. For example, the PCA may be fixed to the cover 114 via a snap-fit, press-fit, an adhesive, heat stakes, slots, tabs, or any other fastening mechanism suitable to fix the PCA 108 to the cover 114.

The removable sensor module 102 may include a light-emitting diode (LED) 206 to indicate the status of the circuit (e.g., tripped or blown fuse or circuit is on). The LED 206 may be arranged on the PCA 108 and in-line with a light pipe 208 terminating in a front of the removable sensor module 102. For example, the light pipe 208 may be arranged below the receptacle 116 and distal to the front surface 146 of the power distribution system 104 to be visible to a user. Alternatively, the LED 206 could be arranged in the cover 114 and electrically connected to the PCA 108.

Figure 3:
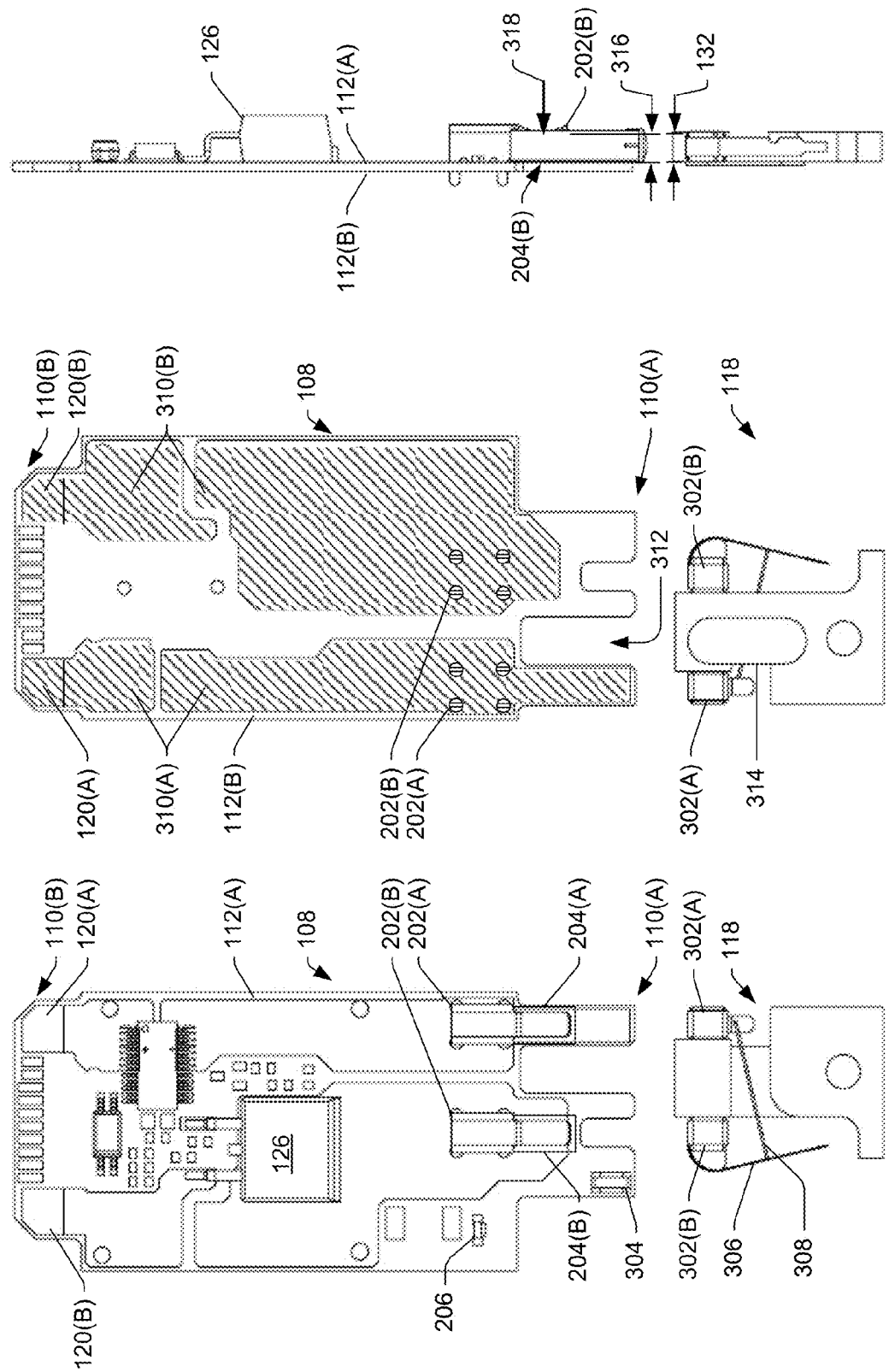
FIG. 3A is a top view of the printed circuit assembly (PCA) and power protection device of the removable sensor module illustrated in FIG. 1.
FIG. 3B is a bottom view of the printed circuit assembly (PCA) and power protection device of the removable sensor module illustrated in FIG. 1.
FIG. 3C is a side view of the printed circuit assembly (PCA) and power protection device of the removable sensor module illustrated in FIG. 1.

FIG. 3A illustrates a top view of the PCA 108 and the power protection device 118 of the removable sensor module 102 illustrated in FIG. 1. FIG. 3A illustrates the one or more clips 202(A) and 202(B) and the cooperating one or more electrical contact pads 204(A) and 204(B) arranged on top of the first planar surface 112(A) to removably receive the power protection device 118. For example, the one or more clips 202(A) and 202(B) and the cooperating one or more electrical contact pads 204(A) and 204(B) may removably receive one or more electrical portions 302(A) and 302(B) (e.g., electrically conductive power input and/or power output metal contacts) of the power protection device 118.

The PCA 108 may comprise a clip 304 arranged in the first planar surface 112(A) to catch an indicating flag 306 when a fuse 308 of the power protection device 118 is tripped. For example, when a load output of a piece of telecommunication equipment exceeds a max current (e.g., 10 A, 15 A, 20 A, 25 A, etc., max current), the fuse 308 may be tripped, releasing the indicating flag 306, allowing the indicating flag 306 to move or spring away from the power protection device 118. Subsequent to the indicating flag 306 being released, the clip 304 interferes or catches the released indicating flag 306. Prior to the clip 304 interfering with the indicating flag 306, the LED may indicate the circuit is on. Subsequent to the clip 304 interfering with the indicating flag 306, the LED may indicate the fuse 308 is tripped.

While FIG. 3A illustrates the PCA 108 comprising the current monitor 126, the PCA 108 may not include the current monitor 126. For example, the PCA 108 may comprise other circuit board configurations with functions other than current monitoring. For example, the PCA 108 may comprise components to monitor a temperature, monitor a voltage, log data, and/or transmit data. The configuration of the PCA may define the configuration of the removable sensor module 102.

FIG. 3B illustrates a bottom view of the PCA 108 and the power protection device 118 of the removable sensor module 102 illustrated in FIG. 1. FIG. 3B illustrates one or more unprotected power input and power output traces 310(A) and 310(B) arranged on top of the second planar surface 112(B), and arranged between the one or more clips 202(A) and 202(B) and the one or more power input and power output contacts 120(A) and 120(B). The one or more unprotected power input and power output traces 310(A) and 310(B) may also be arranged between the one or more electrical contact pads 204(A) and 204(B). The one or more unprotected power input and power output traces 310(A) and 310(B) may electrically connect the one or more clips 202(A) and 202(B) and cooperating one or more electrical contact pads 204(A) and 204(B), and the one or more power input and power output contacts 120(A) and 120(B).

The one or more unprotected power input and power output traces 310(A) and 310(B) arranged on top of the second planar surface 112(B) may dissipate heat directly to ambient air. For example, because the second planar surface 112(B) of the PCA 108 is arranged vertically in the slot 106, and the cover 114 does not cover the second planar surface 112(B), the unprotected power input and power output traces 310(A) and 310(B) are arranged to dissipate heat directly into ambient air. For example, the unprotected power input and power output traces 310(A) and 310(B) arranged on the uncovered second planar surface 112(B) may dissipate heat from the power protection device 118 electrically connected between the one or more clips 204(A) and 204(B) and the one or more electrical contact pads 204(A) and 204(B).

While the one or more power input and power output contacts 120(A) and 120(B) are illustrated in FIGS. 3A and 3B as terminating in a rear edge of the PCA 108, the one or more power input and power output contacts 120(A) and 120(B) may extend out of a top edge and/or a bottom edge of the PCA 108. For example, the one or more power input and power output contacts 120(A) and 120(B) may extend out of a top edge and/or a bottom edge of the PCA 108 to create a 90° removable sensor module 102.

The PCA 108 may include an alignment slot 312 arranged in the first end 110(A) of the PCA 108 for accepting a tab 314 arranged in an exterior surface of the power protection device 118. The alignment slot 312 provides for the receptacle 116 to slidably receive the power protection device 118, and provides for securing the removably received power protection device 118 in the removable sensor module 102.

FIG. 3C illustrates a side view of the PCA 108 and the power protection device 118 of the removable sensor module 102 illustrated in FIG. 1. FIG. 3C illustrates a gap 316 between the one or more clips 202(A) and 202(B) and cooperating one or more electrical contact pads 204(A) and 204(B) to removably receive the power protection device 118. The gap 316 may be about the same as the width 132 of the power protection device 118. For example, the width 132 of the power protection device 118 may be about 0.1 inches (2 millimeters) and the gap 316 may be about 0.1 inches (2 millimeters) wide. Because the gap 316 is about the same as the width 132, the one or more clips 202(A) and 202(B) maintain a force 318 (e.g., a spring force) on the power protection device 118 in the direction towards the one or more electrical contact pads 204(A) and 204(B) when the power protection device 118 is removably received by the one or more clips 202(A) and 202(B) and cooperating one or more electrical contact pads 204(A) and 204(B).

Figure 4:
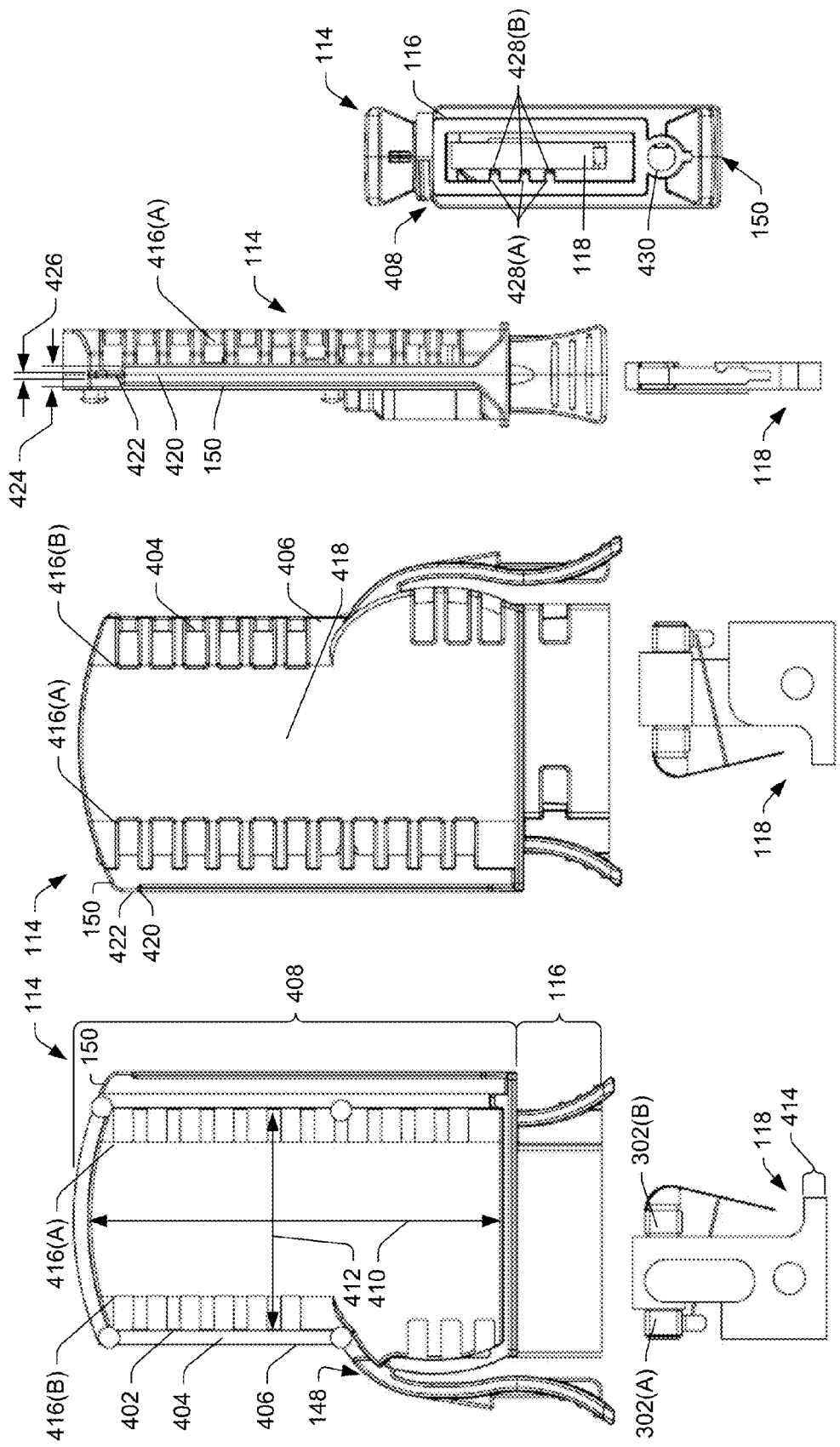
FIG. 4A is a bottom view of the cover and power protection device of the removable sensor module illustrated in FIG. 1.
FIG. 4B is a top view of the cover and power protection device of the removable sensor module illustrated in FIG. 1.
FIG. 4C is a side view of the cover and power protection device of the removable sensor module illustrated in FIG. 1.
FIG. 4D is a front view of the cover and power protection device of the removable sensor module illustrated in FIG. 1.

FIG. 4A illustrates a bottom view of the cover 114 and the power protection device 118 of the removable sensor module 102 illustrated in FIG. 1. FIG. 4A illustrates the cover 114 having a perimeter 402 and a wall 404 arranged around the perimeter 402. The wall 404 may comprise an outside edge 406 arranged around the wall 404. The wall 404 defining a case 408. The case 408 having an overall inside length 410 of about 1.8 inches (45 millimeters) and an overall inside width 412 of about 0.9 inches (23 millimeters). The case 408 being configured to be arranged above a portion of the first planar surface 112(A) to protect the first planar surface 112(A), and not to be arranged above any portion of the second planar surface 112(B). For example, the case 408 may be arranged above the current monitor 126, capacitors, resistors, FETs, traces, and/or at least a portion of the one or more clips 202(A) and 202(B). However, no portion of the case 408 is arranged above the one or more unprotected power input and power output traces 310(A) and 310(B) arranged on top of the second planar surface 112(B).

The cover 114 may comprise the receptacle 116 arranged in the wall 404 distal to the case 408. The receptacle 116 may be arranged to contain the first end 110(A) of the PCA 108, and configured to removably receive at least a portion the power protection device 118. For example, a portion of the gap 316 between the one or more clips 202(A) and 202(B) and cooperating one or more electrical contact pads 204(A) and 204(B) may be arranged in the receptacle 116. The portion of the gap 316 arranged in the receptacle 116 may removably receive the power protection device 118. For example the gap 316 may removably receive the one or more electrical portions 302(A) and 302(B) of the power protection device 118. Further, the receptacle 116 may removably receive a portion the power protection device 118 up to, but not including, a gripping portion 414 of the power protection device 118.

The cover 114 may include one or more vents 416(A) and 416(B) arranged in the wall 404 of the cover 114. For example, the one or more vents 416(A) and 416(B) may be arranged along the long sides of the case 408. For example, the one or more vents 416(A) and 416(B) may be arranged along the long sides of the case 408 substantially along the entire overall inside length 410 of the case 408. When the removable sensor module 102 is inserted into a slot 106, vertically relative to the power distribution system 104, the one or more vents 416(A) may be arranged at the bottom of the removable sensor module 102, and the one or more vents 416(B) may be arranged at the top of the removable sensor module. Thus, the one or more vents 416(A) may draw cool ambient air into the cover 114 from the bottom of the power distribution system 104, and the one or more vents 416(B) may exhaust heated air out of the cover 114 to the top of the power distribution system 104. The one or more vents 416(B) may exhaust air heated by components (e.g., the current monitor 126, capacitors, resistors, FETs, etc.) protected by the case 408.

The cover 114 may comprise the rail 150 arranged on the wall 404 distal to the case 408. For example, the rail 150 may be arrange perpendicular to the wall 404 of the case 408 and span the entire overall inside length 410 of the case 408 on one side of the case 408. Further, the rail 150 may be arranged perpendicular to the wall 404 of the case 408 opposite the latch 148. The rail 150 may provide for guiding the device into and/or out of the power distribution system 104.

The cover 114 may be formed of a single unit of material. For example, the case 408, the receptacle 116, the rail 150, and the latch 148 may all be formed of a single unit of plastic. The cover 114 may be formed of a single unit of plastic via a molding process (e.g., injection molding process, compression molding process, transfer molding process, etc.). Further, the cover 114 may be formed of a single unit of material via a machining process.

FIG. 4B illustrates the one or more vents 416(A) and 416(B) may be arranged in a ceiling 418, as well as the wall 404, of the cover 114. For example, each of the one or more vents 416(A) and 416(B) may extend through the wall 404 and through the ceiling 418 of the case 408.

FIG. 4B illustrates the rail 150 may comprise a flange 420 fixed perpendicularly to an edge 422. The perpendicularly arranged flange 420 and edge 422 defining a substantially T-shaped cross-section of the rail 150.

FIG. 4C is a side view of the cover 114 and power protection device 118 of the removable sensor module 102 illustrated in FIG. 1. FIG. 4C illustrates the flange 420 of the rail 150 may have a width 424 of about 0.06 inches (2 millimeters), and the edge 422 may have a width 426 of about 0.02 inches (0.5 millimeters). The edge 422 and the flange 420 of the rail 150 may be slidably received by the gaps 158 and 162, respectively, illustrated in detail view 156 of FIG. 1.

FIG. 4D is a front view of the cover 114 and power protection device 118 of the removable sensor module 102 illustrated in FIG. 1. FIG. 4D illustrates the receptacle 116 may include a key 428(A) to guide the power protection device 118 into the receptacle 116 when the power protection device 118 is removably inserted into the receptacle 116. Similarly, the power protection device 118 may include a cooperating key 428(B) to mate with the key 428(A) in the receptacle 116. The key 428(A) and cooperating key 428(B) may provide for preventing an improper installation of the power protection device 118, and/or prevent installation of an improper power protection device. For example, the power protection device 118 may be a GMT "grasshopper" type fuse, having the cooperating key 428(B) arranged on an outside surface of the GMT fuse. Similarly, the receptacle 116 may have the key 428(A) arranged in an inside surface of the receptacle 116 configured to only removably receive the GMT fuse having the key 428(B). In this way, the receptacle 116 may provide for preventing an improper installation (e.g., misaligned installation or wrong orientation) of the GMT fuse and/or prevent installation of an improper GMT fuse (improper sized GMT fuse or damaged GMT fuse).

FIG. 4D illustrates an aperture 430 arranged in the wall 404 and distal to the case 408 to receive the light pipe 208. The aperture 430 may be arranged between the receptacle 116 and the rail 150 to position the light pipe 208 to be visible to a user.

Figure 5:
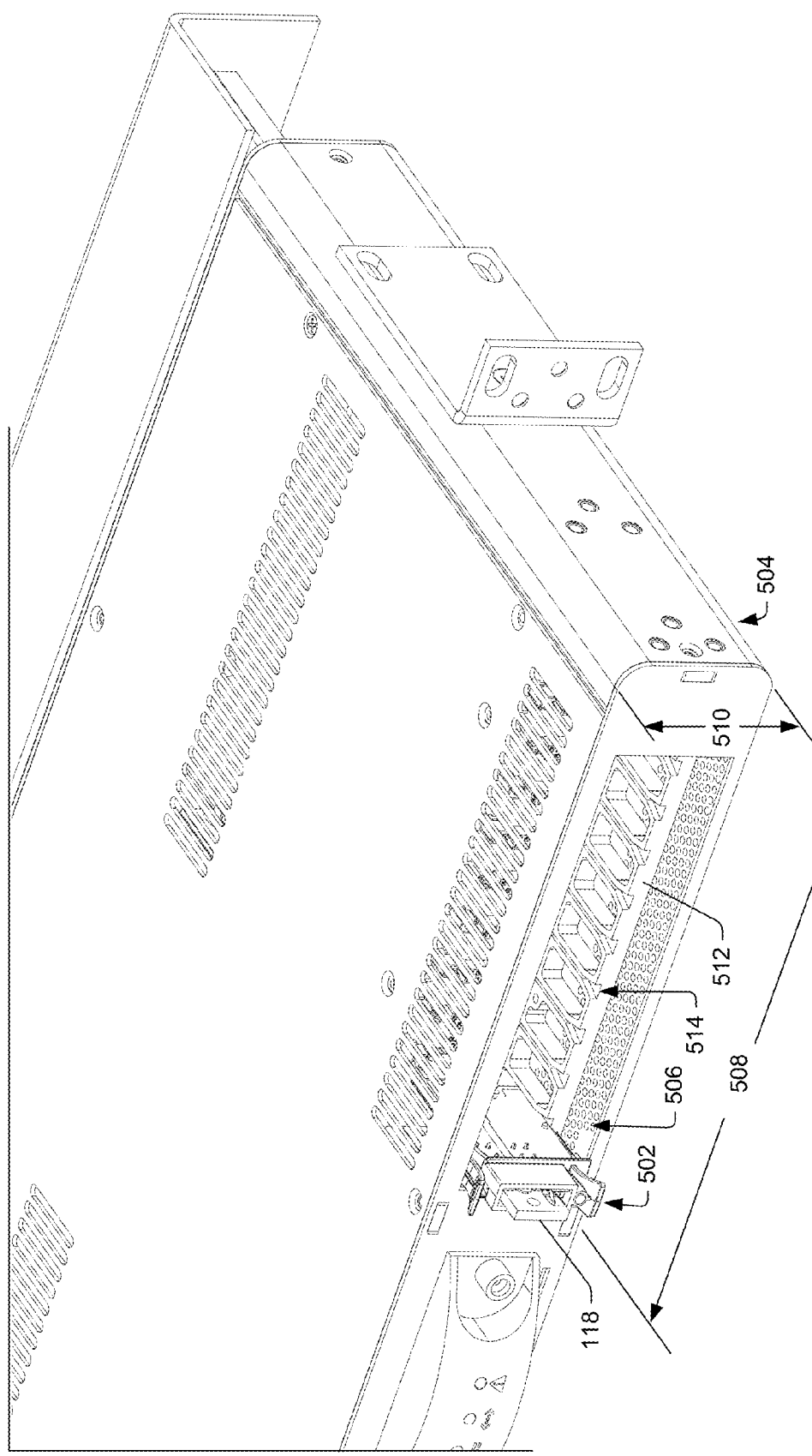
FIG. 5 illustrates another example implementation of a removable sensor module for use in power distribution system.

FIG. 5 illustrates another example implementation of a removable sensor module 502 for use in a power distribution system 504. The removable sensor module 502 may be inserted as a single unit into an opening 506 of the power distribution system 504. The opening 506 may have a width large enough to receive a plurality of removable sensor modules 502. For example, the opening 506 may have a width 508 of about 5 inches (127 millimeters) and a height 510 of about 1.3 inches (33 millimeters). A card guide 512 may be fixed to a bottom inside surface of the power distribution system 504. The card guide 512 may have at least about ten grooves 514 arranged along the width 508 of the power distribution system 504. The grooves 514 may slidably receive the removable sensor modules 502 and guide the removable sensor modules 502 into the power distribution system 504 to blind-mate with an internal electrical component (e.g., a backplane) fixed in the power distribution system 504. Thus, the opening 506 may removably receive at least about ten removable sensor modules 502. The card guide 512 may be a single unit, or individual units, formed of a material (e.g., a plastic, a metal, a composite, etc.).

FIG. 6 illustrates another example implementation of a removable sensor module 602 for use in a power distribution system 604. In this illustrated example, the power distribution system 604 includes grooves 606, similar to grooves 152 illustrated in FIG. 1, arranged in the bottom surface 154 of the power distribution system 604. As discussed above with regard to FIG. 1, the grooves 606 may be arranged to slidably receive the removable sensor modules 602. Here, the power distribution system 604 includes the opening 506 discussed above with regard to FIG. 5, instead of the individual slots 106 illustrated in FIG. 1.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A telecommunication sensor device to be removably coupled between a power protection device and a backplane, the monitoring device comprising:
a printed circuit assembly (PCA) having:
a first end opposite a second end; and
a first planar surface opposite a second planar surface, the first and second planar surfaces arranged between the first and second ends;
one or more clips fixed to the first end and arranged above one or more electrical contact pads arranged on top of the first planar surface, at least one of the one or more clips and the one or more electrical contact pads arranged to cooperatively couple with a power input contact of the power protection device, and at least one of the one or more clips and the one or more contact pads arranged to cooperatively couple with a power output contact of the power protection device,
wherein the one or more clips apply a spring force, in a direction towards the PCA, on the power protection device to force the power input contact of the power protection device and the power output contact of the power protection device against the one or more electrical contact pads arranged on top of the first planar surface.

2. The telecommunication sensor device of claim 1, further comprising a cover having a wall arranged around a perimeter, the wall defining a case, the case arranged above at least a portion of the first planar surface to protect the first planar surface, and the case being absent above the second planar surface to leave the second planar surface unprotected.

3. The telecommunication sensor device of claim 2, wherein the cover comprises a receptacle arranged in the wall and distal to the case to removeably receive the power protection device.

4. The telecommunication sensor device of claim 1, wherein the one or more electrical contact pads comprise traces arranged on a top of the first planar surface.

5. The telecommunication sensor device of claim 1, further comprising:
one or more power input and power output contacts arranged in the second end of the PCA to removeably couple with the backplane.

6. The telecommunication sensor device of claim 5, further comprising:
one or more unprotected power input and power output traces arranged on a top of the second planar surface and arranged between, and electrically connecting, the one or more clips fixed to the first end and the one or more power input and power output contacts arranged in the second end, the one or more unprotected traces arranged on the top of the second planar surface to dissipate heat directly from the one or more unprotected traces to ambient air.

7. The telecommunication sensor device of claim 1, wherein the power protection device comprises a fuse.

8. A monitoring device to be removably coupled to a backplane, the monitoring device comprising:
- a printed circuit assembly (PCA) having:
  - a first end opposite a second end; and
  - a first planar surface opposite a second planar surface, the first and second planar surfaces arranged between the first and second ends;
- a current monitor arranged on the PCA between the first end and the second end; and
- a cover having a wall arranged around a perimeter, the wall defining a case, the wall fixed to the first planar surface and the case arranged above at least a portion of the first planar surface to protect the first planar surface, and the case being absent above the second planar surface to leave the second planar surface unprotected,
- wherein the monitoring device further includes power input and power output contacts, each of the power input and power output contacts comprising exposed planar trace pads arranged at the second end of the PCA and on the first planar surface and/or the second planar surface, and the power input and power output contacts mate with cooperating power input and power output receptacles fixed on the backplane.

9. The monitoring device of claim 8, wherein the current monitor comprises a Hall Effect current monitor.

10. The monitoring device of claim 8, wherein the current monitor is disposed on the portion of the first planar surface protected by the case.

11. The monitoring device of claim 8, further comprising one or more signal contacts fixed to the first planar surface and proximate to the second end, the one or more signal contacts arranged to removably couple with one or more cooperating signal contacts fixed to the backplane.

12. The telecommunication sensor device of claim 2, wherein the cover comprises one or more vents arranged in the wall, the one or more vents to exhaust heat from an inside of the cover.

13. The telecommunication sensor device of claim 2, wherein the cover comprises a light pipe arranged in the wall to receive light from a light-emitting diode (LED) arranged on the first planar surface of the PCA.

14. The telecommunication sensor device of claim 2, wherein the cover is formed of a single unit of material.

15. The telecommunication sensor device of claim 14, wherein the material comprises a plastic.

16. The monitoring device of claim 8, wherein the cover comprises one or more vents arranged in the wall, the one or more vents to exhaust heat from an inside of the cover.

17. The monitoring device of claim 8, wherein the cover comprises a light pipe arranged in the wall to receive light from a light-emitting diode (LED) arranged on the first planar surface of the PCA.

18. The monitoring device of claim 8, wherein the cover is formed of a single unit of material.

19. The monitoring device of claim 18, wherein the material comprises a plastic.

* * * * *